United States Patent
Kameyama

[19]

[11] Patent Number: 6,128,162
[45] Date of Patent: *Oct. 3, 2000

[54] HEAD SLIDER WITH CONSTANT FLYING HEIGHT OVER SLIDING RANGE

[75] Inventor: Masaki Kameyama, Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/988,733

[22] Filed: Dec. 11, 1997

[30] Foreign Application Priority Data

Jun. 26, 1997 [JP] Japan .................................... 9-169711

[51] Int. Cl.⁷ ............................. G11B 5/60; G11B 21/21
[52] U.S. Cl. ................................ 360/236.2; 360/236.1
[58] Field of Search ................................ 360/102, 103, 360/235.4, 235.5, 236.1, 236.2, 236.3, 236.8, 236.9, 237

[56] References Cited

U.S. PATENT DOCUMENTS

| | | | |
|---|---|---|---|
| 5,287,235 | 2/1994 | Cunningham et al. | 360/103 |
| 5,317,465 | 5/1994 | Chapin et al. | 360/103 |
| 5,550,692 | 8/1996 | Crane | 360/103 |
| 5,677,812 | 10/1997 | Cha | 360/103 |
| 5,870,250 | 2/1999 | Bolasna et al. | 360/103 |
| 5,870,251 | 2/1999 | Boutaghou | 360/103 |

FOREIGN PATENT DOCUMENTS

| | | |
|---|---|---|
| 55-105858 | 8/1980 | Japan ...................................... 360/103 |
| 62-164204 | 7/1987 | Japan . |
| 5325464 | 12/1993 | Japan . |
| 6111508 | 4/1994 | Japan . |
| 6203515 | 7/1994 | Japan . |
| 6223525 | 8/1994 | Japan . |
| 06295547 | 10/1994 | Japan . |
| 07021714 | 1/1995 | Japan . |
| 07111053 | 4/1995 | Japan . |
| 07111054 | 4/1995 | Japan . |
| 7-141813 | 6/1995 | Japan . |
| 8-255331 | 10/1996 | Japan . |
| 8-263822 | 10/1996 | Japan . |
| 8-279265 | 10/1996 | Japan . |

*Primary Examiner*—David L. Ometz
*Attorney, Agent, or Firm*—Greer, Burns & Crain, Ltd.

[57] ABSTRACT

A head slider including an inner rail, an outer rail parallel to the inner rail, a center rail formed in the vicinity of an air inlet end of the slider between the inner rail and the outer rail, and a groove defined between the inner rail and the outer rail for expanding air once compressed to generate a negative pressure. A longitudinal center line of at least an intermediate portion of each of the inner rail and the outer rail is inclined a given angle to a longitudinal center line of the slider so that an end portion of the intermediate portion on the side of the air inlet end is nearer to the inner side of a disk.

18 Claims, 13 Drawing Sheets

HEAD SLIDER WITH CONSTANT FLYING HEIGHT OVER SLIDING RANGE

BACKGROUND OF THE INVENTION

1. Field of the Invention

The present invention relates generally to a flying magnetic head slider used in a magnetic disk drive, and more particularly to a negative-pressure slider intended for a small flying height.

2. Description of the Related Art

In recent years, a magnetic disk drive has increasingly been reduced in size and enlarged in capacity, requiring that the spacing between an electromagnetic transducer formed on a head slider and a recording layer of a magnetic disk is as small as possible, so that it is essential to smooth out a disk surface and to reduce a slider flying height. To maintain the durability of the disk drive and satisfy its recording and reproducing characteristics, it is preferable to minimize the slider flying height so that the contact between the slider and the disk surface is avoided. Further, a slider having excellent flying stability is desired because a large acceleration is applied in an accessing direction to obtain a high access speed.

In an existing magnetic disk drive, the roughness of the disk surface is substantially constant irrespective of radial positions on the disk, so that it is necessary to maintain the slider flying height at a substantially constant low level irrespective of radial positions on the disk. Further, in a recent magnetic disk drive, a rotary positioner is widely used for the purposes of size reduction of the magnetic disk drive and simplification of a mechanism, and a negative-pressure slider with less variations in flying height due to changes in yaw angle is desired.

As a negative-pressure magnetic head slider having excellent flying stability, there has been proposed a slider having a pair of rails decreased in rail width from an air inlet end toward an air outlet end and defining a groove between the pair of rails to generate a negative pressure in the groove (Japanese Patent Laid-open No. 4-228157). FIG. 1A is a plan view of a conventional negative-pressure magnetic head slider disclosed in the above publication, and FIG. 1B is a perspective view of the slider shown in FIG. 1A. The slider denoted by reference numeral 2 has a rectangular shape as viewed in plan, and it has an air inlet end 2a and an air outlet end 2b.

A pair of rails 4 and 6 for generating a positive pressure are formed on a disk opposing surface of the slider 2. The rails 4 and 6 have flat air bearing surfaces (rails surfaces) 4a and 6a for generating a flying force during rotation of a disk, respectively. Tapering surfaces 4b and 6b are formed at the air inlet end portions of the rails 4 and 6, respectively. A groove 8 for expanding the air once compressed to generate a negative pressure is defined between the rails 4 and 6.

An electromagnetic transducer 10 is formed on the air outlet end 2b of the slider 2 at a position where the rail 4 is located. A center rail 11 is formed between the rails 4 and 6 on the air inlet end 2a side. Each of the rails 4 and 6 has a width larger at the air inlet end portion and the air outlet end portion and smaller at the intermediate portion, thereby suppressing variations in flying height due to changes in yaw angle. Further, by forming the tapering surfaces 4b and 6b at the air inlet end portions of the rails 4 and 6, variations in flying height due to deposition of dust can be suppressed. FIG. 1B is a perspective view of the slider 2 as viewed from the side of the rail surfaces, in which the broken arrows show a positive pressure acting on the slider 2, and the solid arrows show a negative pressure acting on the slider 2. The positive pressure is generated at the rail surfaces 4a and 6a, and the negative pressure is generated at the groove 8.

Longitudinal center lines of the rails 4 and 6 are substantially parallel to a longitudinal center line of the slider 2. In a magnetic disk drive, the magnetic head slider is mounted on a rotary arm for positioning the slider in the radial direction of a magnetic disk, and the yaw angle of the slider (the angle between a rotational direction of the disk and a longitudinal center line of the slider) continuously changes from the inner side to the outer side of the magnetic disk. When the yaw angle becomes large, the track width of the magnetic disk is decreased to cause a reduction in output. To prevent such an output reduction, the conventional slider is mounted on the rotary arm so that the yaw angle of the slider becomes 0 degree between an innermost track and an outermost track of the magnetic disk.

FIG. 2 shows flying characteristics of the conventional slider shown in FIGS. 1A and 1B. In FIG. 2, the horizontal axis represents radial distance from the center of the magnetic disk, and the vertical axis represents flying height of the slider. As apparent from FIG. 2, the flying height of the slider increases near a radially central position on the magnetic disk. This is due to the following facts. As shown in FIG. 3A, the flying height of the slider increases with an increase in radial distance in the case that the yaw angle of the slider is assumed to be constant irrespective of radial positions on the magnetic disk. That is, since the peripheral speed of the magnetic disk increases with an increase in radial distance, the flying height of the slider increases with an increase in peripheral speed in the case that the yaw angle is constant.

In contrast, as shown in FIG. 3B, the flying height of the slider is maximum at or near a slider yaw angle of o degree in the case that the peripheral speed of the magnetic disk is assumed to be constant over the entire radial range from the innermost track to the outermost track of the disk. The above fact that the flying height of the slider is maximum at or near a slider yaw angle of 0 degree as shown in FIG. 3B is considered to be caused by the following. That is, in the case that air is introduced into the space between the disk surface and the slider in the same direction as the longitudinal center lines of the rails 4 and 6 (the yaw angle is 0 degree, the positive pressure generated on the slider becomes maximum, resulting in a maximum flying height of the slider.

In contrast, when the angle between the air introducing direction and the longitudinal center line of each rail is increased, the positive pressure is decreased to result in a decrease in flying height. Accordingly, the combination of the flying characteristics shown in FIG. 3A and the flying characteristics shown in FIG. 3B provides the flying characteristics shown in FIG. 2 such that the flying height of the conventional slider increases near a radially central position on the magnetic disk. In a conventional general magnetic disk drive with a relatively large flying height, the increase in flying height near a radially central position on the magnetic disk is negligibly small. However, in the case of adopting a negative-pressure slider in response to an increase in density of a recent magnetic disk drive, the slider flying height is small, causing a deterioration in receiving and reproducing characteristics near a radially central position on the magnetic disk.

SUMMARY OF THE INVENTION

It is therefore an object of the present invention to provide a head slider which can maintain a slider flying height substantially constant irrespective of radial positions on a magnetic disk.

It is another object of the present invention to provide a disk drive including a head slider which can maintain a slider flying height substantially constant irrespective of radial positions on a magnetic disk.

In accordance with an aspect of the present invention, there is provided a head slider having an air inlet end, an air outlet end, and a disk opposing surface opposed to a disk, comprising an inner rail formed on the disk opposing surface so as to extend from the air inlet end to the air outlet end, the inner rail having a flat air bearing surface for generating a flying force during rotation of the disk; an outer rail formed on the disk opposing surface in spaced relationship with the inner rail so as to extend from the air inlet end to the air outlet end, the outer rail having a flat air bearing surface for generating a flying force during rotation of the disk; and a groove defined between the inner rail and the outer rail for expanding air once compressed to generate a negative pressure; wherein a longitudinal center line of the inner rail and a longitudinal center line of the outer rail are parallel to each other and inclined a given angle to a longitudinal center line of the slider so that end portions of the inner rail and the outer rail on the side of the air inlet end are nearer to the inner side of the disk.

Alternatively, only intermediate portions of the inner rail and the outer rail may be inclined a given angle to the longitudinal center line of the slider so that end portions of the intermediate portions on the side of the air inlet end are nearer to the inner side of the disk rather than inclining the whole of the inner and outer rails to the longitudinal center line of the slider.

In accordance with another aspect of the present invention, there is provided a disk drive comprising a housing; a disk rotatably mounted in the housing; a head slider having a transducer for reading/writing data from/to the disk; and an actuator for moving the head slider across tracks of the disk; the head slider comprising an inner rail formed on a disk opposing surface so as to extend from an air inlet end to an air outlet end, the inner rail having a flat air bearing surface for generating a flying force during rotation of the disk; an outer rail formed on the disk opposing surface in spaced relationship with the inner rail so as to extend from the air inlet end to the air outlet end, the outer rail having a flat air bearing surface for generating a flying force during rotation of the disk; and a groove defined between the inner rail and the outer rail for expanding air once compressed to generate a negative pressure; wherein the head slider is mounted on the actuator so that a yaw angle at an innermost track of the disk is a first given angle; and a longitudinal center line of the inner rail and a longitudinal center line of the outer rail are parallel to each other and inclined a second given angle greater than the first given angle to a longitudinal center line of the slider so that end portions of the inner rail and the outer rail on the side of the air inlet end are nearer to the inner side of the disk.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 7 is a graph showing the relation between radial position on a disk and flying height of the slider according to the first preferred embodiment;

DETAILED DESCRIPTION OF THE PREFERRED EMBODIMENTS

Figure 4:
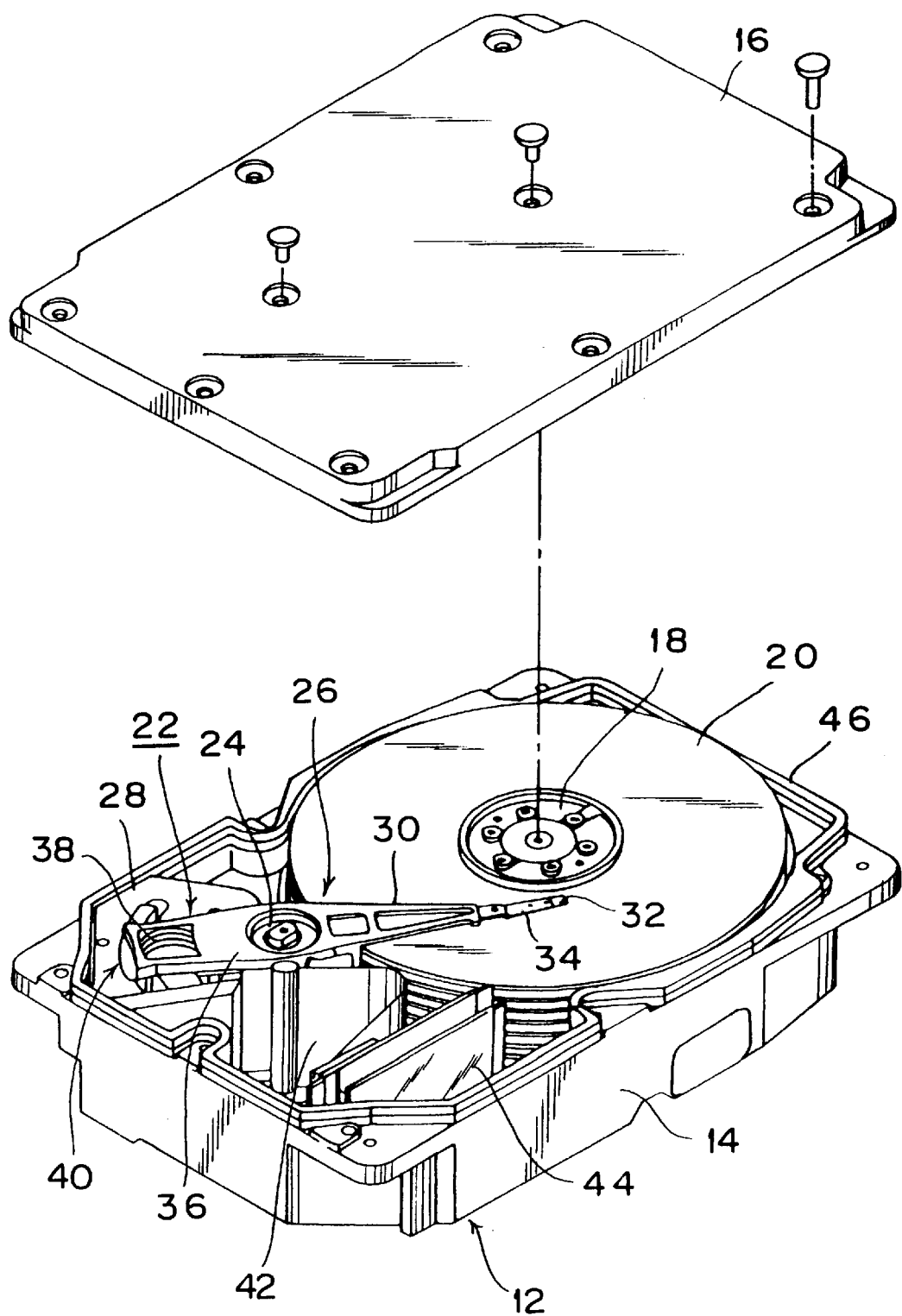
FIG. 4 is a perspective view of a magnetic disk drive adopting a magnetic head slider according to the present invention.

Referring to FIG. 4, there is shown a perspective view of a magnetic disk drive in which a magnetic head slider according to the present invention is mounted.

Reference numeral 12 denotes a housing (disk enclosure) consisting of a base 14 and a cover 16. A spindle hub (not shown) rotatably driven by an inner hub motor is provided on the base 14. A plurality of magnetic disks 20 and spacers (not shown) are mounted on the spindle hub in such a manner as to be alternately stacked. That is, the plural magnetic disks 20 are fixedly mounted on the spindle hub by securing a disk clamp 18 to the spindle hub by screws, and are equally spaced a given distance by the spacers.

Reference numeral 22 denotes a rotary actuator consisting of an actuator arm assembly 26 and a magnetic circuit 28. The actuator arm assembly 26 is mounted so as to be rotatable about a shaft 24 fixed to the base 14. The actuator arm assembly 26 includes a plurality of actuator arms 30 extending from the center of rotation in one direction and a coil supporting member 36 extending from the center of rotation in a direction opposite to the direction of extension of the actuator arms 30.

A suspension 34 is fixed at its base end portion to a front end portion of each actuator arm 30. A magnetic head slider 32 is supported on a front end portion of the suspension 34. A coil 38 is supported by the coil supporting member 36. The magnetic circuit 28 and the coil 38 inserted in a gap of the magnetic circuit 28 constitute a voice coil motor (VCM) 40.

Reference numeral 42 denotes a flexible printed circuit board (FPC) for taking a signal from an electromagnetic transducer mounted on the head slider 32. The flexible printed circuit board 42 is fixed at its one end by a fixing member 44, and is electrically connected to a connector (not shown). An annular packing assembly 46 is mounted on the base 14. The housing 12 is sealed by securing the cover 16 through the packing assembly 46 to the base 14 by screws.

Figure 5:
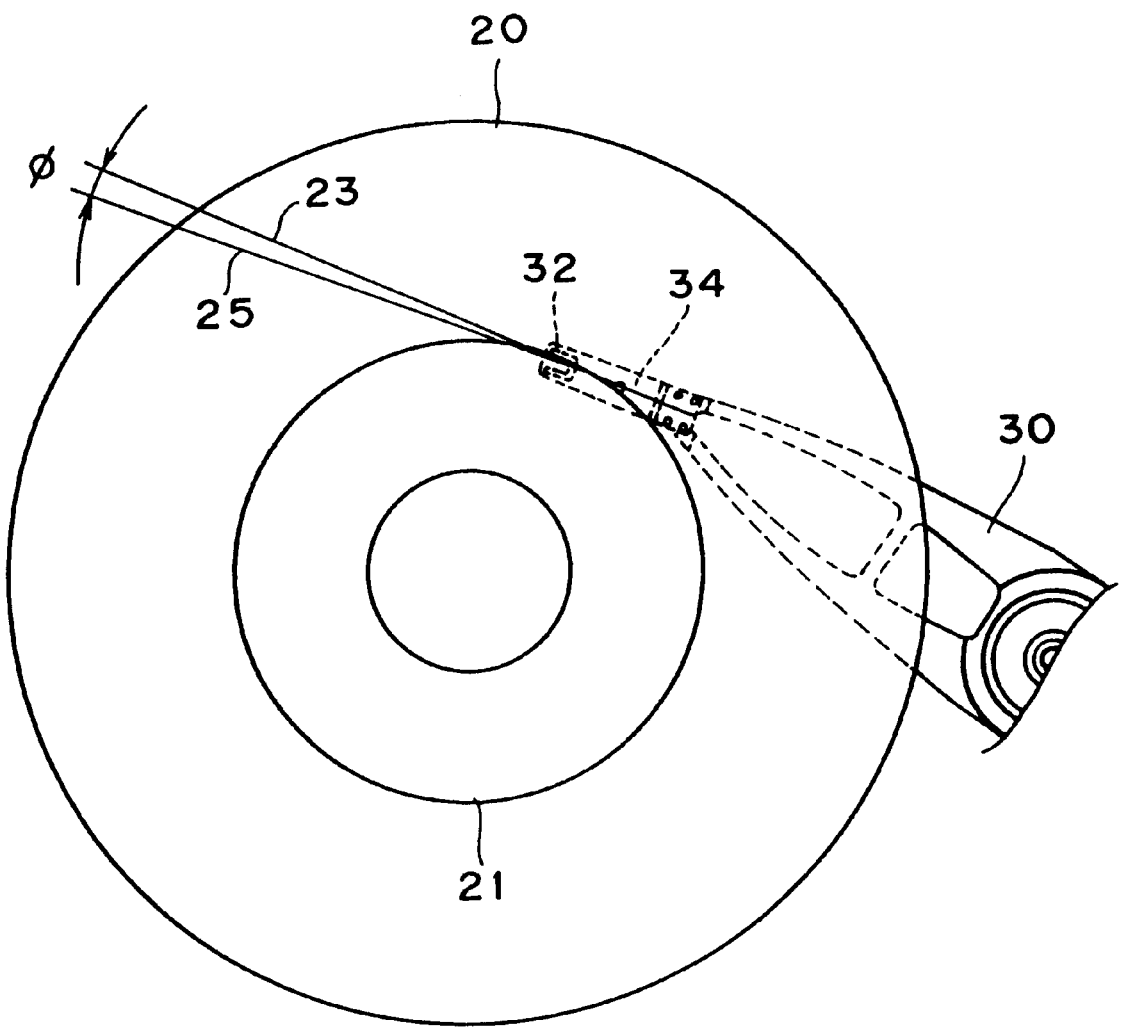
FIG. 5 is a schematic plan view illustrating the yaw angle of the slider shown in FIG. 4.

The yaw angle of the head slider 32 will now be described with reference to FIG. 5. As mentioned above, the yaw angle φ is an angle between a rotational direction of the magnetic disk 20 and a longitudinal center line 25 of the head slider 32. In other words, the yaw angle φ is an angle between a tangent to a circular track 21 of the magnetic disk 20 and the longitudinal center line 25 of the head slider 32. The suspension 34 is mounted on the arm 30 in such a manner that the yaw angle φ becomes 0 degree between an innermost track and an outermost track of the magnetic disk 20. The yaw angle at the innermost track is about 10 degrees.

Figure 6:
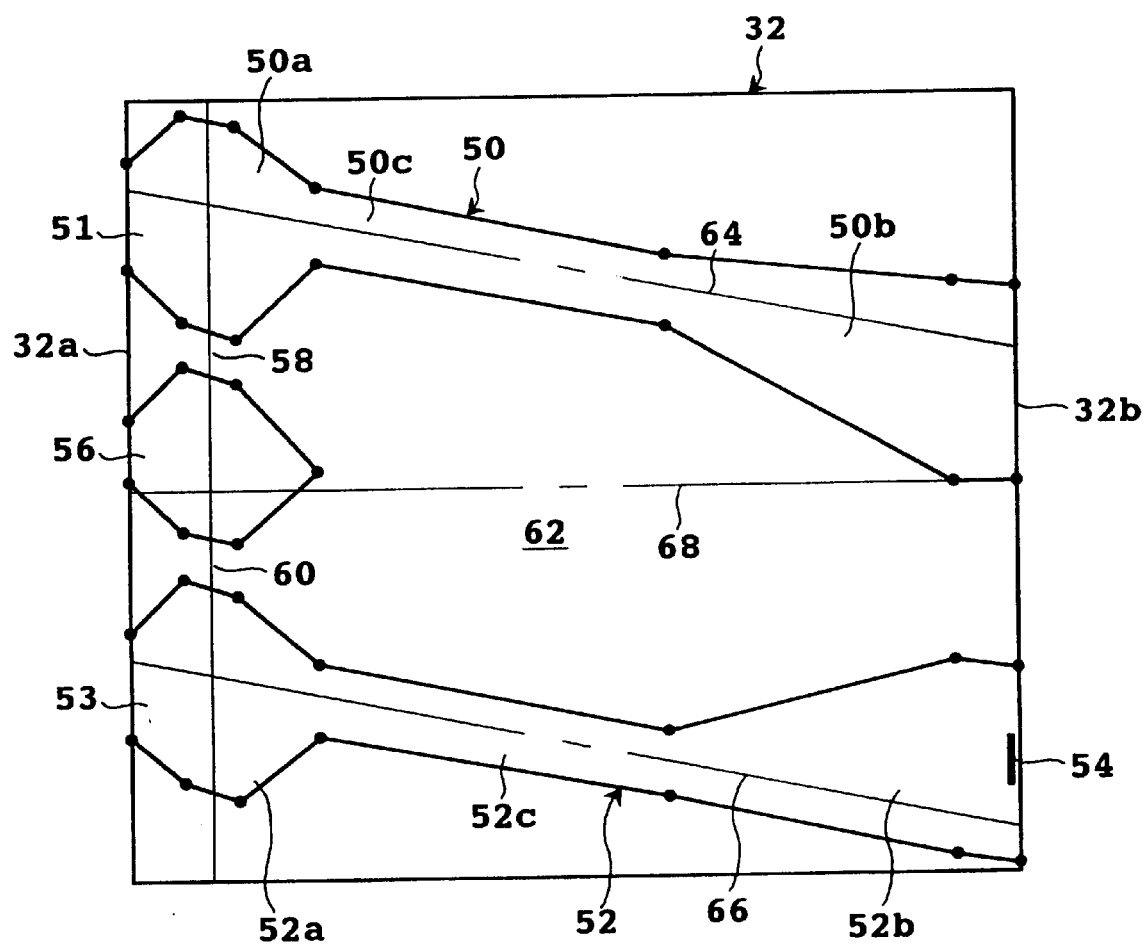
FIG. 6 is a plan view of a slider according to a first preferred embodiment of the present invention.

FIG. 6 is a plan view of the magnetic head slider 32 according to a first preferred embodiment of the present invention. The magnetic head slider 32 has an air inlet end 32a and an air outlet end 32b, and has a rectangular shape as viewed in plan. The magnetic head slider 32 is supported from the left side as viewed in FIG. 6 by the suspension 34 shown in FIG. 4. The disk opposing surface of the magnetic head slider 32 is formed with an inner rail 50 and an outer rail 52 spaced from each other. Each of the inner rail 50 and the outer rail 52 has a flat rail surface (air bearing surface).

The inner rail 50 includes a wide air inlet end portion 50a, a wide air outlet end portion 5b, and a narrow intermediate portion 50c. Similarly, the outer rail 52 includes a wide air inlet end portion 52a, a wide air outlet end portion 52b, and a narrow intermediate portion 52c. The air inlet end portion 50a of the inner rail 50 is formed with a tapering surface 51, and the air inlet end portion 52a of the outer rail 52 is also formed with a tapering surface 53. Further, an electromagnetic transducer 54 is formed on the air inlet end portion 52b of the outer rail 52.

By widening the air inlet end portions and the air outlet end portions of the inner rail 50 and the outer rail 52 and narrowing the intermediate portions of the inner rail 50 and the outer rail 52, fluctuations in flying height due to changes in yaw angle of the slider can be suppressed. Furthermore, by forming the tapering surfaces 51 and 53 on the air inlet end portions of the inner rail 50 and the outer rail 52, deposition of dust on the front end surfaces of the rails 50 and 52 is prevented by positive pressures generated on the tapering surfaces 51 and 53.

A center rail 56 is formed at an air inlet end portion of the magnetic head slider 32, and slits 58 and 60 are defined between the center rail 56 and the inner rail 50 and between the center rail 56 and the outer rail 52, respectively. Further, a negative pressure generating groove 62 continuing to the slits 58 and 60 is defined between the inner rail 50 and the outer rail 52. The slits 58 and 60 are similarly inclined to both the inner rail 50 and the outer rail 52, so as to improve the air introducing characteristics and the flying stability.

A longitudinal center line 64 of the inner rail 50 and a longitudinal center line 66 of the outer rail 52 are parallel to each other, and are inclined about 15 degrees to a longitudinal center line 68 of the slider 32 so that the air inlet end portions 50a and 52a are nearer to the inner side of the disk. The yaw angle of the slider 32 at the innermost track of the magnetic disk in this preferred embodiment is about 10 degrees.

The slider 32 is formed from $Al_2O_3$—TiC by first forming a plurality of electromagnetic transducers 54 on a wafer, next cutting the wafer into bars, next working a side surface of each bar to form a plurality of sets of inner rails 50, outer rails 52, and center rails 56, and finally cutting the bar to obtain individual sliders 32. Each slider 32 has a size of 1.25 mm×1.0 mm×0.4 mm, for example. Each of the inner rail 50 and the outer rail 52 has a minimum width of 100 μm or less at the intermediate portions 50c and 52c. Accordingly, the inner rail 50, the outer rail 52, and the center rail 56 are formed by photolithography.

That is, after applying a resist with a desired rail pattern to be formed, the wafer is cut by ion milling to form the slits 58 and 60 and the groove 62. The tapering surfaces 51 and 53 are formed by machining before or after forming the inner rail 50 and the outer rail 52. The tapering angle of each of the tapering surfaces 51 and 53 is set to preferably 0.5 degrees to 4.0 degrees, and the length of each of the tapering surfaces 51 and 53 is set to preferably 1/10 to 1/20 of the length of each of the rails 50 and 52. A positive pressure is generated at the rail surfaces (air bearing surfaces) of the inner rail 50 and the outer rail 52, and a negative-pressure attraction force is generated at the groove 62. That is, the air once compressed at the slits 58 and 60 is expanded at the groove 62 to thereby generate a negative pressure at the groove 62.

Figure 7:
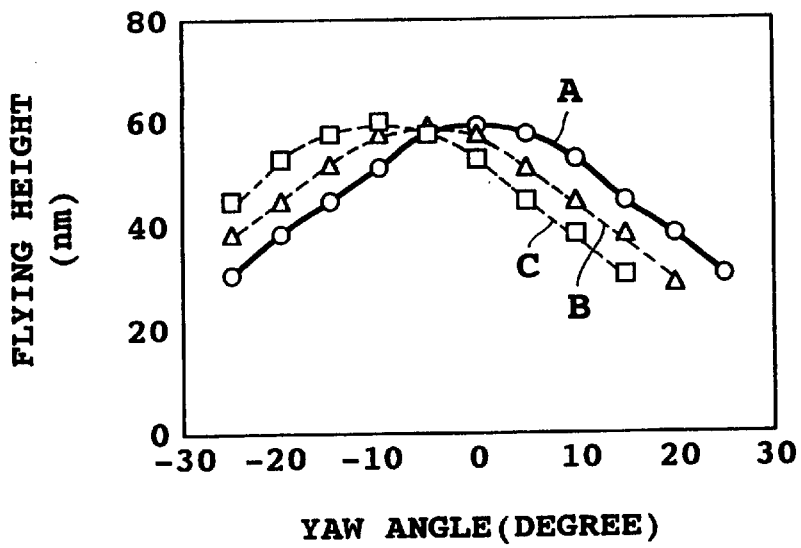
FIG. 7 is a graph showing the relation between slider yaw angle and slider flying height according to an inclination of the rails.

Referring to FIG. 7, there is shown the relation between slider yaw angle and slider flying height according to an inclination of the rails. The curve A corresponds to the conventional slider, and the curves B and C correspond to the sliders according to the present invention, wherein the curve B is the case that the inner rail and the outer rail are inclined about 5 to the longitudinal center line of the slider, and the curve C is the case that the inner rail and the outer rail are inclined about 10 degrees to the longitudinal center line of the slider. In the conventional slider shown by the curve A, the flying height of the slider is maximum at a yaw angle of 0 degree. In the sliders according to the present invention shown by the curves B and C, the yaw angle corresponding to a maximum flying height is shifted to the inner side of the disk with an increase in inclination angle of the inner rail and the outer rail to the longitudinal center line of the slider.

Therefore, assuming that the peripheral speed of the disk is constant over the entire radial range from the innermost track to the outermost track of the disk, the peripheral speed dependence of the slider flying height can be canceled by inclining the inner rail 50 and the outer rail 52 so that the slider flying height decreases from the innermost track to the outermost track. Accordingly, the slider flying height can be made constant irrespective of radial positions on the disk.

Figure 1A:
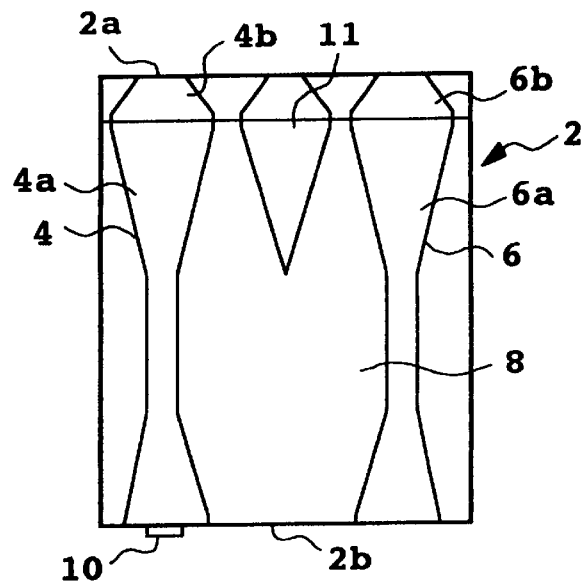
FIG. 1A is a plan view of a conventional magnetic head slider.
Figure 1B:
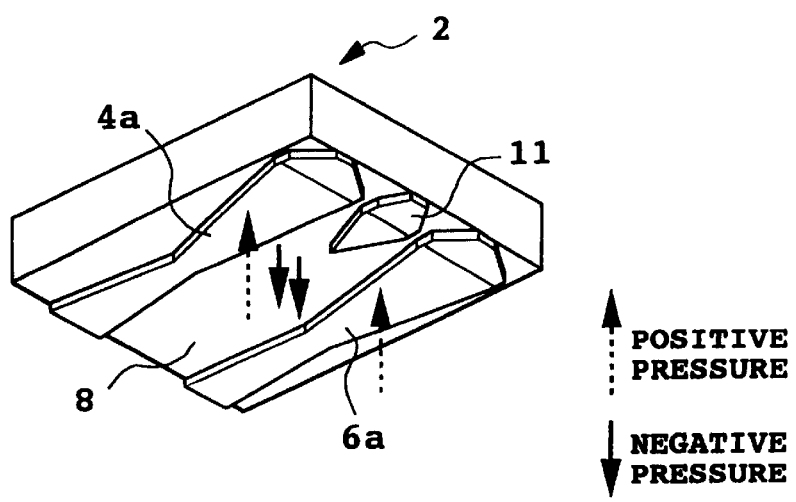
FIG. 1B is a perspective view of the slider shown in FIG. 1A.
Figure 2:
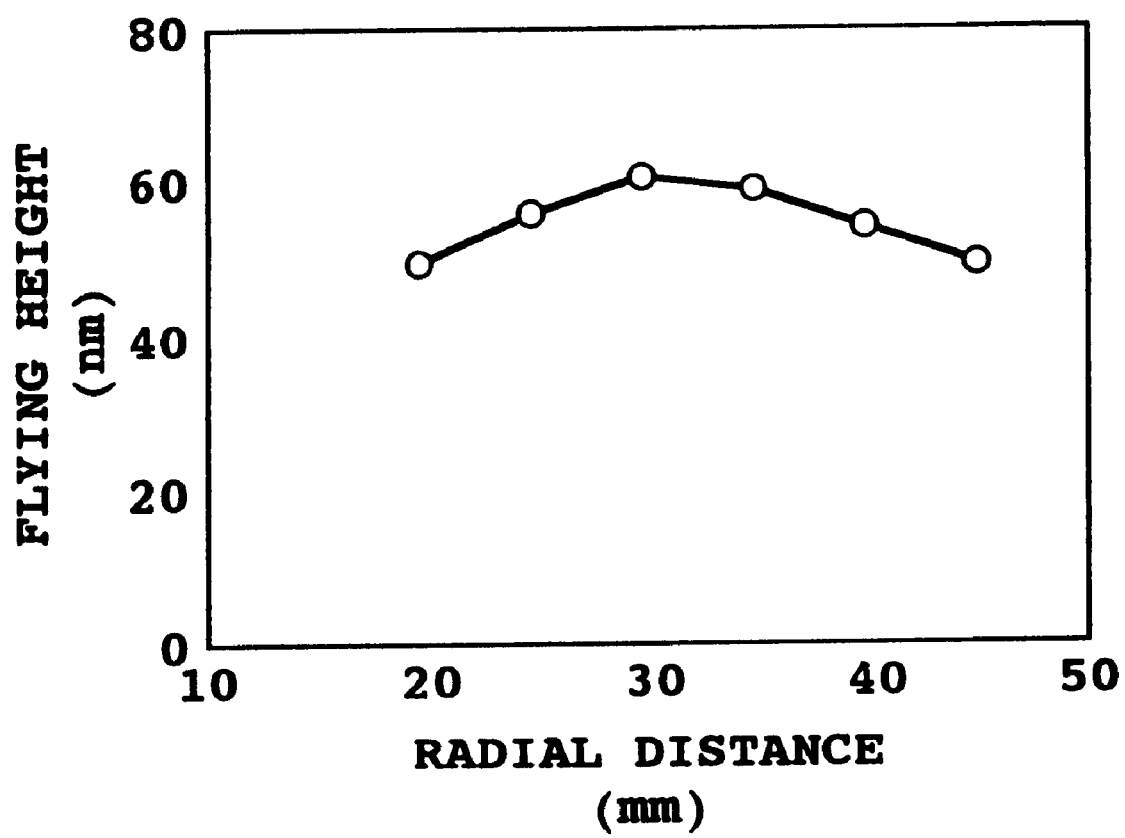
FIG. 2 is a graph showing the relation between radial position on a disk and flying height of the conventional slider.
Figure 3A:
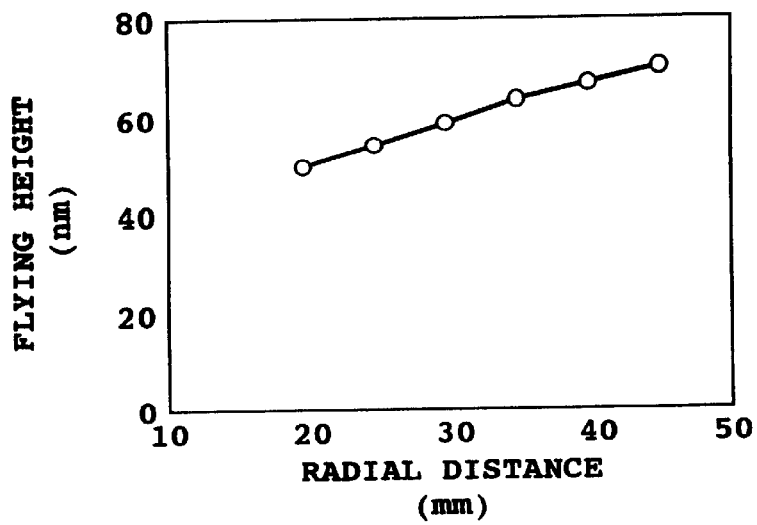
FIG. 3A is a graph showing the peripheral speed dependence of flying height of the conventional slider.
Figure 3B:
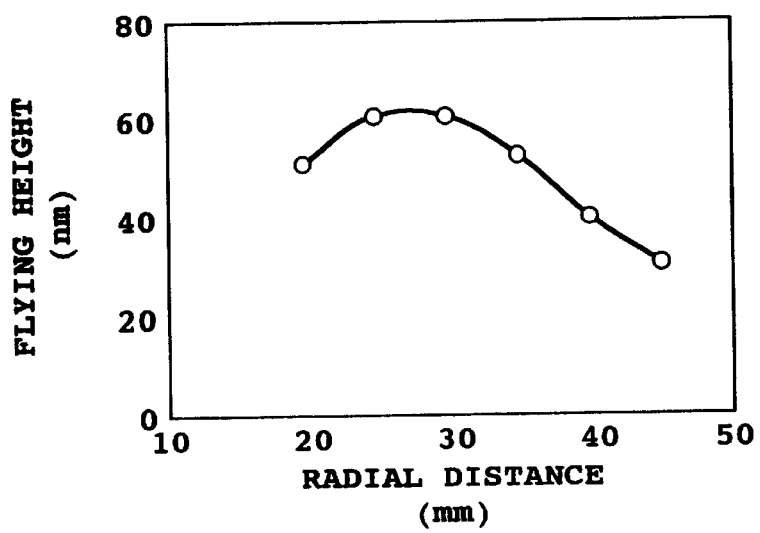
FIG. 3B is a graph showing the yaw angle dependence of flying height of the conventional slider.
Figure 8:
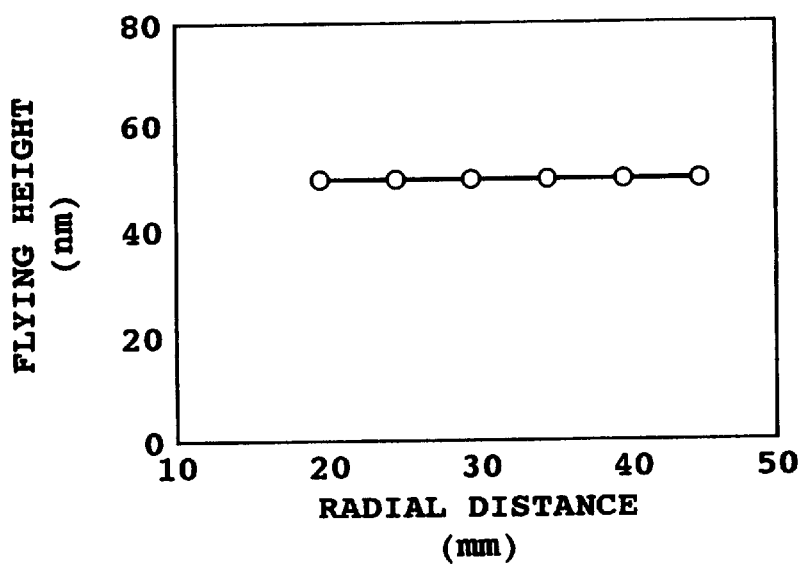

FIG. 8 shows the relation between radial distance from the center of the disk to the slider of the first preferred embodiment of the present invention and slider flying height. As apparent from FIG. 8, the slider flying height is substantially constant irrespective of radial positions on the disk, and as compared with the conventional slider shown in FIG. 2' an increase in the flying height at a radially central position is reduced.

Figure 9A:
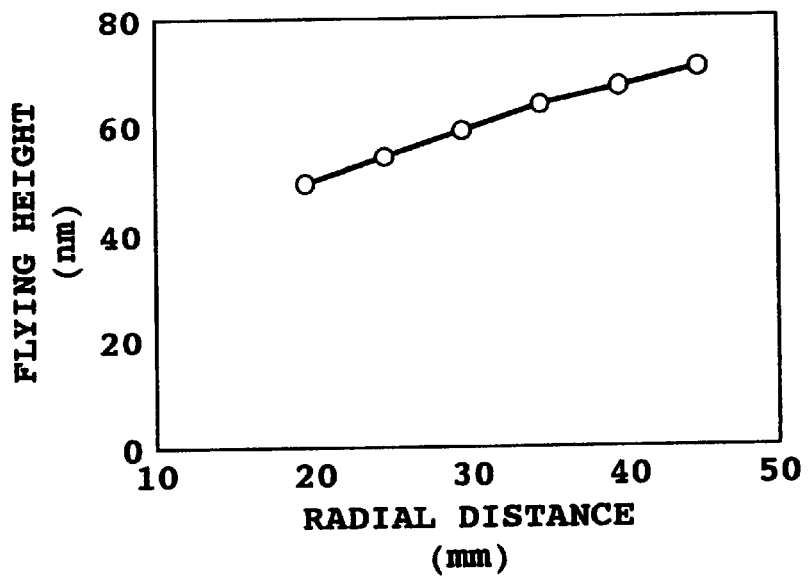
FIG. 9A is a graph showing the peripheral speed dependence of flying height of the slider according to the first preferred embodiment.
Figure 9B:
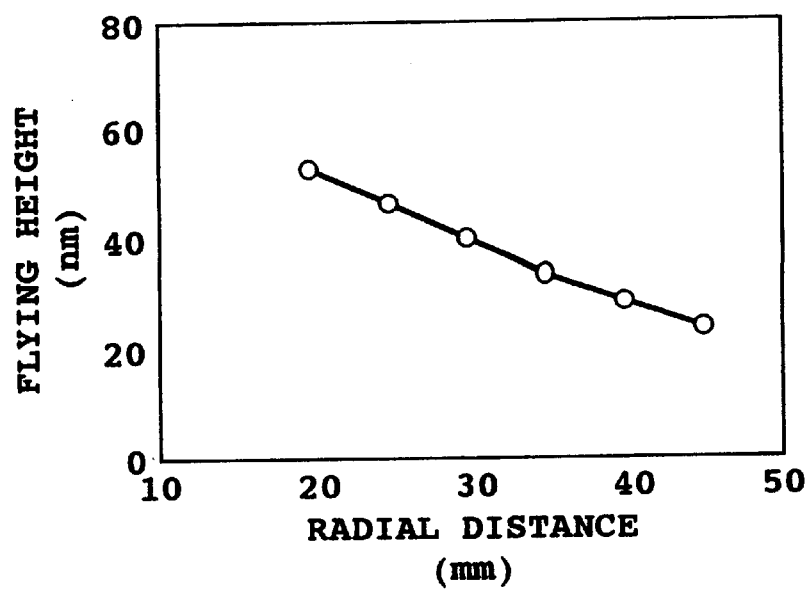
FIG. 9B is a graph showing the yaw angle dependence of flying height of the slider according to the first preferred embodiment.

FIG. 9A shows the relation between radial position on the disk and slider flying height in the case that the yaw angle of the slider of the first preferred embodiment is assumed to be constant over the entire radial range from the innermost track to the outermost track of the disk. In other words, FIG. 9A shows the peripheral speed dependence of the slider flying height in the first preferred embodiment. FIG. 9B shows the relation between radial position on the disk and slider flying height in the first preferred embodiment in the case that the peripheral speed of the disk is assumed to be constant over the entire radial range from the innermost track to the outermost track of the disk. In other words, FIG. 9B shows the yaw angle dependence of the slider flying height in the first preferred embodiment.

The combination of the peripheral speed dependence shown in FIG. 9A and the yaw angle dependence shown in FIG. 9B corresponds to the slider flying characteristics in the first preferred embodiment shown in FIG. 8. To obtain a substantially constant flying height of the slider over the entire radial range from the innermost track to the outermost track of the disk, the inclination angle of the inner rail and the outer rail is set preferably in the range of about 10 degrees to about 20 degrees, more preferably at about 15 degrees. The inclination angle of each rail is preferably greater than the slider yaw angle at the innermost track.

Figure 10B:
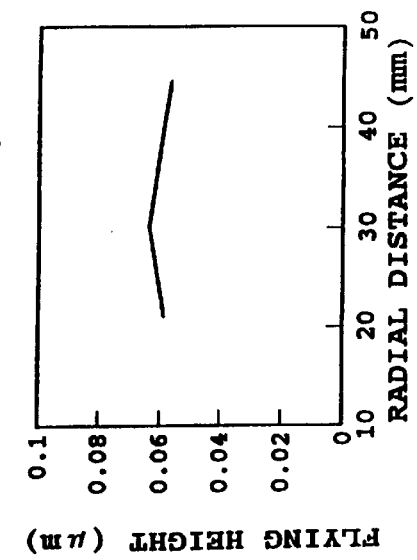
FIGS. 10A to 10D are graphs showing the relations between various inclination angles of the rails and slider flying height.
Figure 10D:
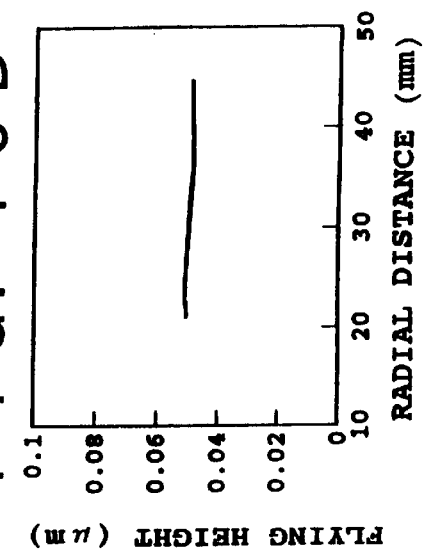
Figure 10A:
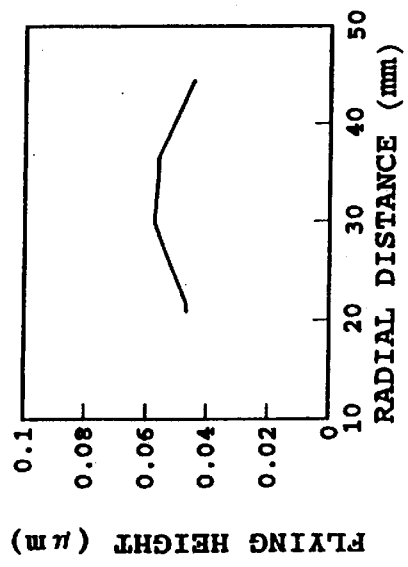
Figure 10C:
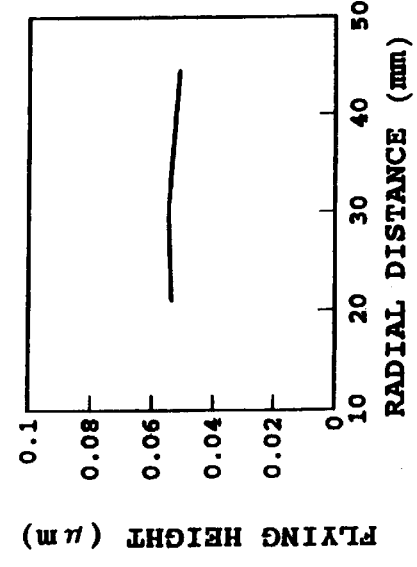

Referring to FIGS. 10A to 10D, there are shown the relations between various inclination angles of the inner and outer rails 50 and 52 and slider flying height in the case that the slider yaw angle at the innermost track of the magnetic disk is 10 degrees. FIG. 10A shows the case that the inclination angle of the inner and outer rails 50 and 52 is 0 degree, which case coincides with the relation shown in FIG. 2 in the prior art. FIG. 10B shows the case that the inclination angle is 5 degrees; FIG. 10C shows the case that the inclination angle is 10 degrees; and FIG. 10D shows the case that the inclination angle is 15 degrees.

As apparent from FIGS. 10A to 10D in comparison, the peak of the slider flying height decreases with an increase in the inclination angle of the inner and outer rails 50 and 52. In the case that the inclination angle of the inner and outer rails 50 and 52 is 15 degrees and is greater than the slider yaw angle of 10 degrees at the innermost track of the disk as shown in FIG. 10D, the slider flying height becomes substantially constant irrespective of radial positions on the disk.

In the magnetic head slider 32 of the first preferred embodiment mentioned above, the inner rail 50 and the outer rail 52 are inclined to the longitudinal center line 68 of the slider over the entire length of the slider. Accordingly, if the width of the slider 32 is the same as the width of the conventional slider, the inner rail 50 and the outer rail 52 will partially project from the lateral edges of the slider. As a result, the width of the slider must be increased to cause an increase in weight of the slider and a reduction in mass productivity. There will now be described a magnetic head slider 32A according to a second preferred embodiment of the present invention solving the above problem with reference to FIG. 11.

The magnetic head slider 32A has an air inlet end 32a and an air outlet end 32b, and has a substantially rectangular shape as viewed in plan. The disk opposing surface of the magnetic head slider 32A is formed with an inner rail 70 and an outer rail 72 spaced from each other. Each of the inner rail 70 and the outer rail 72 has a flat rail surface (air bearing surface). The inner rail 70 includes a wide air inlet end portion 70a, a wide air outlet end portion 70b, and a narrow intermediate portion 70c connecting the air inlet end portion 70a and the air outlet end portion 70b.

Similarly, the outer rail 72 includes a wide air inlet end portion 72a, a wide air outlet end portion 72b, and a narrow intermediate portion 72c connecting the air inlet end portion 72a and the air outlet end portion 72b. The air inlet end portions 70a and 72a of the inner and outer rails 70 and 72 are formed with the tapering surfaces 71 and 73, respectively. A center rail 76 is formed at an air inlet end portion of the slider 32A between the inner rail 70 and the outer rail 72, and slits 78 and 80 are defined between the center rail 76 and the air inlet end portion 70a of the inner rail 70 and between the center rail 76 and the air inlet end portion 72a of the outer rail 72, respectively.

The slits 78 and 80 are parallel to a longitudinal center line 88 of the slider 32A, so as to improve air introducing characteristics and flying stability. Alternatively, the slits 78 and 80 may be inclined as shown in FIG. 6 by considering the total balance of the inner rail, the outer rail, and the center rail. Further, a negative pressure generating groove 82 continuing to the slits 78 and 80 is defined between the inner rail 70 and the outer rail 72. An electromagnetic transducer 74 is formed on the air outlet end portion 72b of the outer rail 72.

The slider 32A of this preferred embodiment is formed from $Al_2O_3$—TiC like the slider 32 of the first preferred embodiment shown in FIG. 6. The manufacturing process for the slider 32A is similar to that for the slider 32 of the first preferred embodiment, so the description thereof will be omitted herein. In the slider 32A of this preferred embodiment, only the intermediate portions 70c and 72c of the inner and outer rails 70 and 72 are inclined at a given angle to the longitudinal center line 88 of the slider 32A.

More specifically, a longitudinal center line 84 of the intermediate portion 70c of the inner rail 70 and a longitudinal center line 86 of the intermediate portion 72c of the outer rail 72 are parallel to each other, and are inclined at about 15 degrees to the longitudinal center line 88 of the magnetic head slider 32A so that their end portions on the air inlet end 32a side are nearer to the inner side of the disk. Also in the second preferred embodiment characterized in that only the intermediate portions 70c and 72c of the inner and outer rails 70 and 72 are inclined to the longitudinal center line 88 of the slider 32A, an effect similar to that of the slider 32 of the first preferred embodiment shown in FIG. 6 can be obtained, because a positive pressure generated at the intermediate portions 70c and 72c of the inner and outer rails 70 and 72 is relatively larger than a positive pressure generated at the other portions of the inner and outer rails 70 and 72.

The inclination angle of the intermediate portions 70c and 72c is set preferably in the range of about 10 degrees to about 20 degrees, more preferably at about 15 degrees. The yaw angle of the slider 32A at the innermost track of the magnetic disk is about 10 degrees. The inclination angle of the intermediate portions 70c and 72c of the inner and outer rails 70 and 72 is set preferably greater than the slider yaw angle at the innermost track of the magnetic disk.

Figure 12:
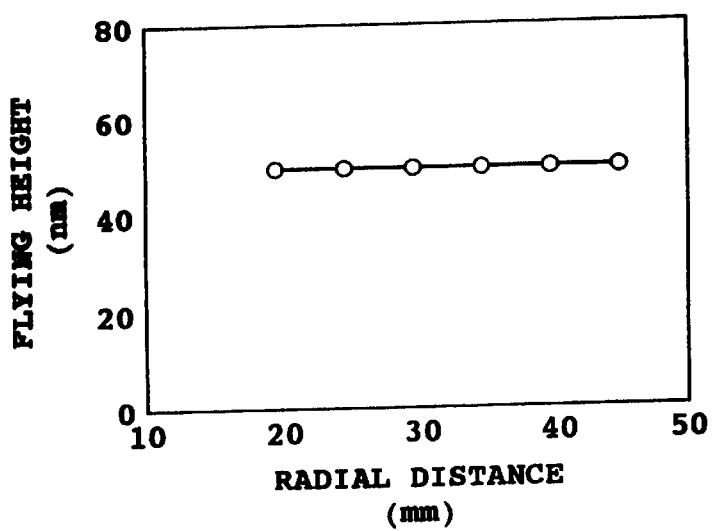
FIG. 12 is a graph showing the relation between radial position on a disk and flying height of the slider according to the second preferred embodiment.

In the magnetic head slider 32A of the second preferred embodiment as mentioned above, only the intermediate portions 70c and 72c of the inner and outer rails 70 and 72 are inclined a given angle to the longitudinal center line of the slider. Accordingly, the slider flying height can be maintained substantially constant irrespective of radial positions on the disk without increasing the width of the slider as compared with the width of the conventional slider. FIG. 12 shows the relation between radial position on the disk and flying height of the slider 32A of the second preferred embodiment. As apparent from FIG. 12, the flying height of the slider 32A is maintained substantially constant over the entire radial range from the innermost track to the outermost track of the disk.

Figure 13A:
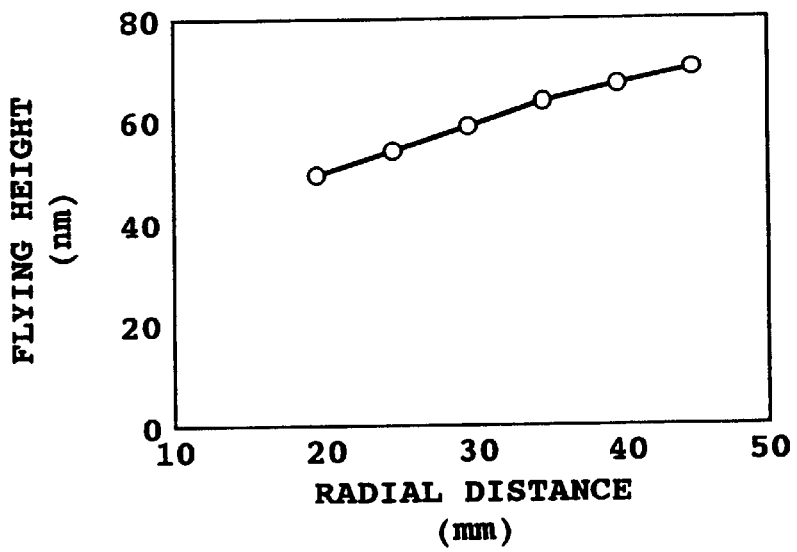
FIG. 13A is a graph showing the peripheral speed dependence of flying height of the slider according to the second preferred embodiment.
Figure 13B:
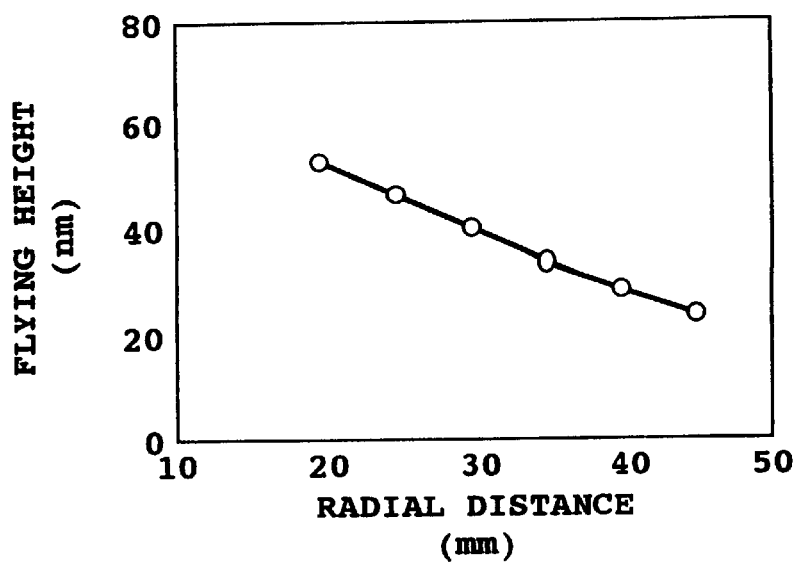
FIG. 13B is a graph showing the yaw angle dependence of flying height of the slider according to the second preferred embodiment.

FIG. 13A shows the peripheral speed dependence of the flying height of the slider 32A of the second preferred embodiment. That is, FIG. 13A shows the relation between radial position on the disk and slider flying height in the case that the yaw angle of the slider 32A of the second preferred embodiment is assumed to be constant over the entire radial range from the innermost track to the outermost track of the disk. FIG. 13B shows the yaw angle dependence of the flying height of the slider 32A of the second preferred embodiment. That is, FIG. 13B shows the relation between radial position on the disk and flying height of the slider 32A in the case that the peripheral speed of the disk is assumed to be constant over the entire radial range from the innermost track to the outermost track of the disk. The combination of the peripheral speed dependence shown in FIG. 13A and the yaw angle dependence shown in FIG. 13B corresponds to the flying characteristics of the slider 32A shown in FIG. 12.

Figure 14:
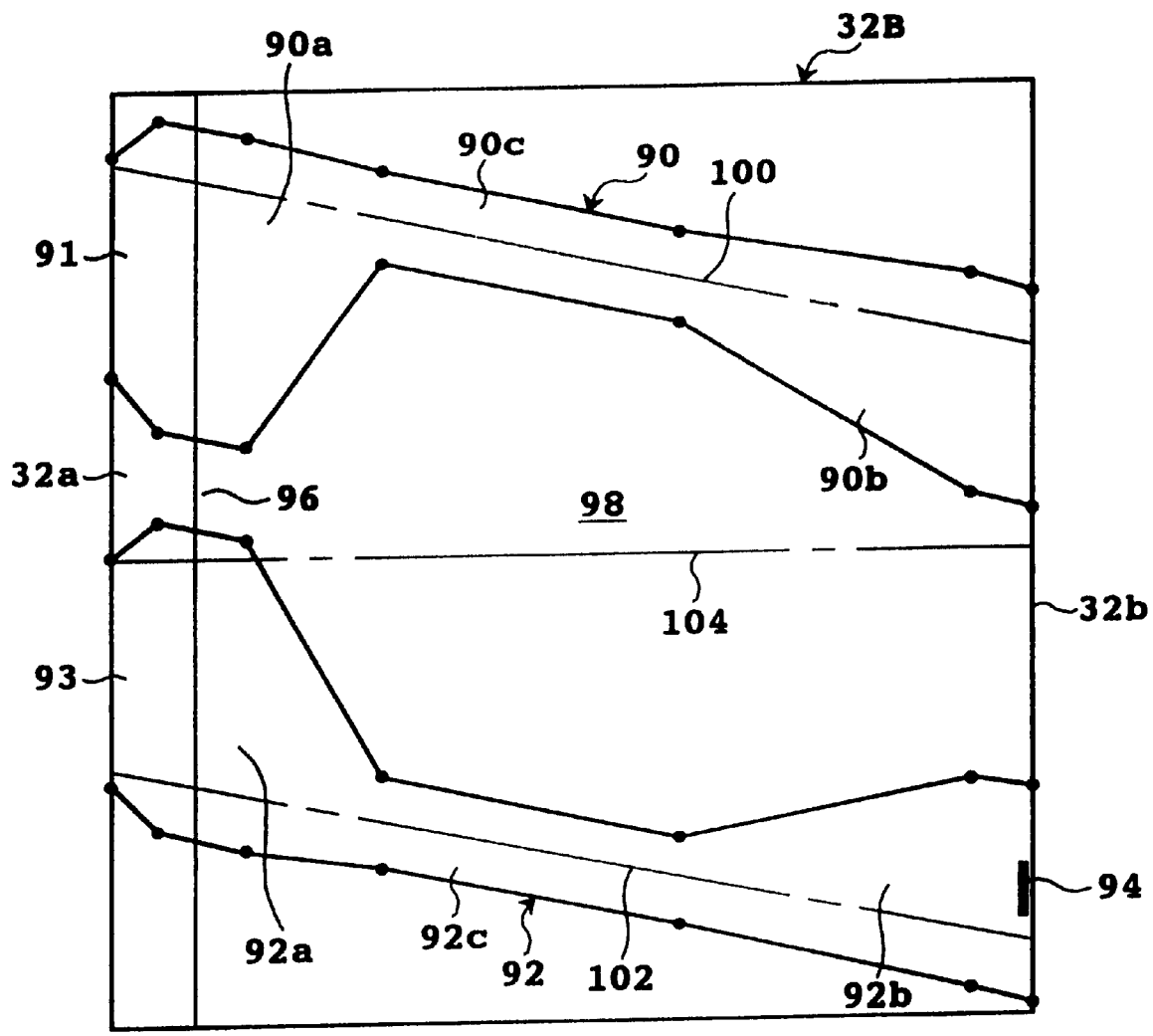
FIG. 14 is a plan view of a slider according to a third preferred embodiment of the present invention.

FIG. 14 is a plan view of a magnetic head slider 32B according to a third preferred embodiment of the present invention. The magnetic head slider 32B has an air inlet end 32a and an air outlet end 32b, and has a rectangular shape as viewed in plan. The disk opposing surface of the magnetic head slider 32B is formed with an inner rail 90 and an outer rail 92 spaced from each other. Each of the inner rail 90 and the outer rail 92 has a flat rail surface (air bearing surface).

The inner rail 90 includes a wide air inlet end portion 90a, a wide air outlet end portion 90b, and a narrow intermediate portion 90c. Similarly, the outer rail 92 includes a wide air inlet end portion 92a, a wide air outlet end portion 92b, and a narrow intermediate portion 92c. The air inlet end portion 90a of the inner rail 90 is formed with a tapering surface 91, and the air inlet end portion 92a of the outer rail 92 is also formed with a tapering surface 93. Further, an electromagnetic transducer 94 is formed on the air outlet end portion 92b of the outer rail 92.

By widening the air inlet end portions and the air outlet end portions of the inner and outer rails 90 and 92 and narrowing the intermediate portions of the inner and outer rails 90 and 92, fluctuations in flying height due to changes in yaw angle of the slider can be suppressed. Furthermore, by forming the tapering surfaces 91 and 93 on the air inlet end portions of the inner and outer rails 90 and 92, deposition of dust on the front end surfaces of the rails 90 and 92 is prevented by positive pressures generated on the tapering surfaces 91 and 93.

A slit 96 is defined between the air inlet end portion 90a of the inner rail 90 and the air inlet end portion 92a of the outer rail 92. Further, a negative pressure generating groove 98 continuing to the slit 96 is defined between the inner rail 90 and the outer rail 92. A longitudinal center line 100 of the inner rail 90 and a longitudinal center line 102 of the outer rail 92 are parallel to each other, and are inclined about 13 degrees to a longitudinal center line 104 of the slider 32B so that the air inlet end portions 90a and 92a are nearer to the inner side of the disk. The yaw angle of the slider 32B at the innermost track of the magnetic disk in this preferred embodiment is about 8 degrees.

Also in this preferred embodiment wherein the negative-pressure slider 32B has no center rail, the slider flying height can be made substantially constant irrespective of radial positions on the disk by inclining the inner rail 90 and the outer rail 92 a given angle or more, preferably greater than the slider yaw angle at the innermost track of the magnetic disk.

Figure 15:
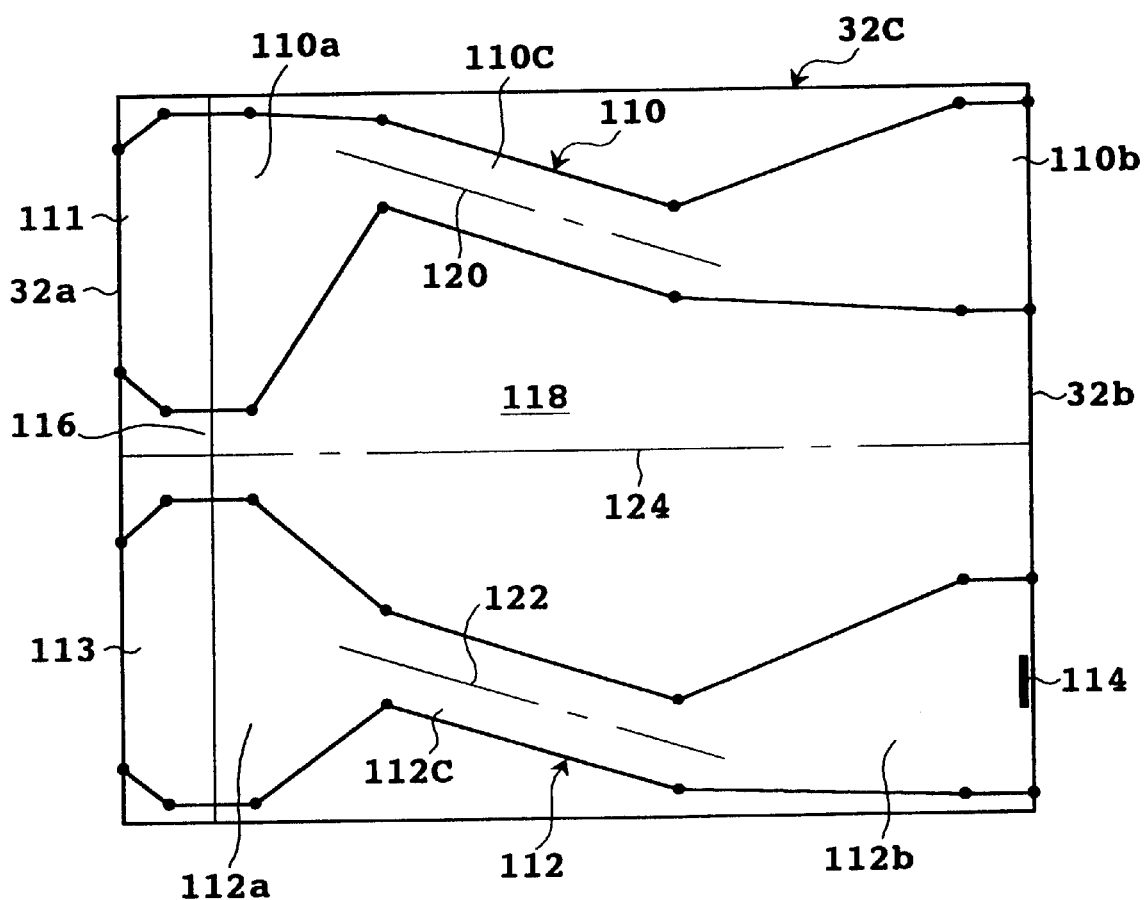
FIG. 15 is a plan view of a slider according to a fourth preferred embodiment of the present invention.

FIG. 15 is a plan view of a magnetic head slider 32C according to a fourth preferred embodiment of the present invention. The magnetic head slider 32C has an air inlet end 32a and an air outlet end 32b, and has a substantially rectangular shape as viewed in plan. The disk opposing surface of the magnetic head slider 32C is formed with an inner rail 110 and an outer rail 112 spaced from each other. Each of the inner rail 110 and the outer rail 112 has a flat rail surface (air bearing surface).

The inner rail 110 includes a wide air inlet end portion 110a, a wide air outlet end portion 10b, and a narrow intermediate portion 110c connecting the air inlet end portion 110a and the air outlet end portion 10b. Similarly, the outer rail 112 includes a wide air inlet end portion 112a, a wide air outlet end portion 112b, and a narrow intermediate portion 112c connecting the air inlet end portion 112a and the air outlet end portion 112b.

The air inlet end portions 110a and 112a of the inner and outer rails 110 and 112 are formed with tapering surfaces 111 and 113, respectively. A slit 116 is defined between the air inlet end portion 110a of the inner rail 110 and the air inlet end portion 112a of the outer rail 112. Further, a negative pressure generating groove 118 continuing to the slit 116 is defined between the inner rail 110 and the outer rail 112. An electromagnetic transducer 114 is formed on the air outlet end portion 112b of the outer rail 112.

Figure 11:
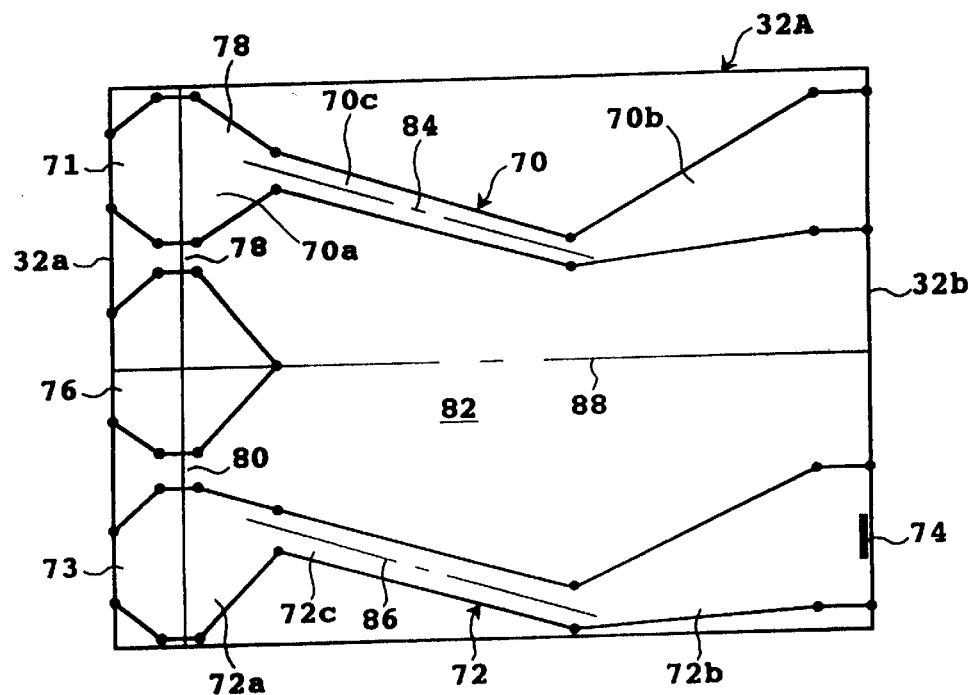
FIG. 11 is a plan view of a slider according to a second preferred embodiment of the present invention.

In the slider 32C of the fourth preferred embodiment, like the second preferred embodiment shown in FIG. 11, only the intermediate portions 110c and 112c of the inner and outer rails 110 and 112 are inclined at a given angle to a longitudinal center line 124 of the slider 32C. More specifically, a longitudinal center line 120 of the intermediate portion 110c of the inner rail 110 and a longitudinal center line 122 of the intermediate portion 112c of the outer rail 112 are parallel to each other, and are inclined at about 16 degrees to the longitudinal center line 124 of the slider 32C so that their end portions on the air inlet end 32a side are nearer to the inner side of the disk.

Also in this preferred embodiment wherein the negative-pressure slider 32C has no center rail, an effect similar to that of the second preferred embodiment shown in FIG. 11 can be obtained. The yaw angle of the slider 32C at the innermost track of the magnetic disk is about 12 degrees. The inclination angle of the intermediate portions 110c and 112c of the inner and outer rails 110 and 112 is set preferably greater than the yaw angle of the slider 32C at the innermost track of the magnetic disk.

The present invention is not limited to the above preferred embodiments. For example, only one of the inner rail and the outer rail may be inclined a given angle toward the inner side of the magnetic disk within the scope of the present invention. As another embodiment, only an intermediate portion of one of the inner and outer rails may be inclined toward the inner side of the disk. Also in this embodiment, a similar effect can be obtained. In such cases, close attention must be paid to the balance of the slider. For example, the widths of the inner rail and the outer rail must be made different from each other.

According to the present invention as described above, it is possible to provide a magnetic head slider which can maintain the flying height substantially constant irrespective of radial positions on the disk to thereby prevent a deterioration in recording and reproducing characteristics near a radially central position on the disk.

What is claimed is:

1. A head slider having an air inlet end, an air outlet end, an inner side, an outer side, and a disk opposing surface configured to be opposed to a disk, wherein when said head slider is in its operative position, said inner side faces radially inwardly of the disk and said outer side faces radially outwardly of the disk, said head slider comprising:

an inner rail formed on said disk opposing surface so as to extend substantially from said air inlet end to said air outlet end, said inner rail having a generally flat air bearing surface for generating a flying force during rotation of said disk, said inner rail comprising a first air inlet end portion, a first air outlet end portion, and a first intermediate portion connecting said first air inlet end portion and said first air outlet end portion;

an outer rail formed on said disk opposing surface in spaced relationship from said inner rail so as to extend substantially from said air inlet end to said air outlet end, said outer rail having a generally flat air bearing surface for generating a flying force during rotation of said disk, said outer rail comprising a second air inlet end portion, a second air outlet end portion, and a second intermediate portion connecting said second air inlet end portion and said second air outlet end portion; and a groove defined between said inner rail and said outer rail for expanding air once compressed to generate a negative pressure;

wherein a longitudinal center line of said first intermediate portion of said inner rail and a longitudinal center line of said second intermediate portion of said outer rail are inclined at a given angle with respect to a longitudinal center line of said slider so that end portions of said first and second intermediate portions on the side of said air inlet end are nearer to said inner side of said head slider;

and further wherein longitudinal center lines of portions of said inner and outer rails other than said first and second intermediate portions are not inclined at said given angle, whereby said longitudinal center lines of said first and second intermediate portions of said inner and outer rails are the only longitudinal center lines of said inner and outer rails inclined at said given angle.

2. A head slider according to claim 1, further comprising a center rail formed in the vicinity of said air inlet end between said inner rail and said outer rail.

3. A head slider according to claim 1, wherein said first intermediate portion is narrower than said first air inlet end portion and said first air outlet end portion, and said second intermediate portion is narrower than said second air inlet end portion and said second air outlet end portion.

4. A head slider according to claim 1, wherein longitudinal center lines of said first and second air inlet ends of said inner and outer rails are defined to be generally parallel to said longitudinal center line of said slider.

5. A head slider according to claim 1, wherein longitudinal center lines of said first and second air outlet ends of said inner and outer rails are inclined at a second given angle with respect to said longitudinal center line of said slider so that end portions of said first and second air outlet ends on the side of said air inlet end are nearer to said outer side of said head slider.

6. A disk drive comprising:

a housing;

a disk rotatably mounted in said housing;

a head slider having a transducer for reading/writing data from/to said disk; and an actuator for moving said head slider across tracks of said disk;

said head slider including:

an inner side facing radially inwardly of said disk;

an outer side facing radially outwardly of said disk;

an inner rail formed on a disk opposing surface so as to extend substantially from an air inlet end to an air outlet end, said inner rail having a generally flat air bearing surface for generating a flying force during rotation of said disk;

an outer rail formed on said disk opposing surface in spaced relationship with said inner rail so as to extend substantially from said air inlet end to said air outlet end, said outer rail having a generally flat air bearing surface for generating a flying force during rotation of said disk; and a groove defined between said inner rail and said inner rail and said outer rail for expanding air once compressed to generate a negative pressure;

wherein said head slider is mounted on said actuator so that a yaw angle at an innermost track of said disk is a first given angle; and a longitudinal center line of said inner rail and a longitudinal center line of said outer rail are inclined at a second given angle with respect to a longitudinal center line of said slider, and wherein said second given angle is greater than said first given angle so that end portions of said longitudinal center lines of said inner rail and said outer rail on the side of said air inlet end are nearer to said inner side of said head slider.

7. A disk drive according to claim 6, wherein said head slider further comprises a center rail formed in the vicinity of said air inlet end between said inner rail and said outer rail;

wherein a longitudinal center line of said center rail is inclined at said second given angle with respect to said longitudinal center line of said slider so that an end portion of said center rail on the side of said air inlet end is nearer to said inner side of said head slider.

8. A disk drive according to claim 6, wherein said first given angle is approximately 10°.

9. A disk drive according to claim 6, wherein said second given angle is between approximately 10° and 20°.

10. A disk drive according to claim 6, wherein said first given angle is approximately 10°, said yaw angle at an outermost track is approximately 0°, and said second given angle is approximately 15°.

11. A disk drive comprising:

a housing;

a disk rotatably mounted in said housing;

a head slider having a transducer for reading/writing data from/to said disk; and an actuator for moving said head slider across tracks of said disk;

said head slider including:

an inner side facing radially inwardly of said disk;

an outer side facing radially outwardly of said disk;

an inner rail formed on a disk opposing surface of said head slider so as to extend substantially from an air inlet end to an air outlet end, said inner rail having a generally flat air bearing surface for generating a flying force during rotation of said disk, said inner rail comprising a first air inlet end portion, a first air outlet end portion, and a first intermediate portion connecting said first air inlet end portion and said first air outlet end portion;

an outer rail formed on said disk opposing surface in spaced relationship with said inner rail so as to extend substantially from said air inlet end to said air outlet end, said outer rail having a generally flat air bearing surface for generating a flying force during rotation of said disk, said outer rail comprising a second air inlet end portion, a second air outlet end portion, and a second intermediate portion connecting said second air inlet end portion and said second air outlet end portion; and a groove defined between said inner rail and said outer rail for expanding air once compressed to generate a negative pressure;

wherein said head slider is mounted on said actuator so that a yaw angle at an innermost track of said disk is a first given angle; and a longitudinal center line of said first intermediate portion of said inner rail and a longitudinal center line of said second intermediate portion of said outer rail are inclined at a second given angle with respect to a longitudinal center line of said slider, wherein said second given angle is greater than said first given angle so that end portions of said first and second intermediate portions on the side of said air inlet end are nearer to said inner side of said head slider;

and further wherein longitudinal center lines of portions of said inner and outer rails other than said first and second intermediate portions are not inclined at said second given angle, whereby said longitudinal center lines of said first and second intermediate portions of said inner and outer rails are the only longitudinal center lines of said inner and outer rails inclined at said second given angle.

12. A disk drive according to claim 11, wherein longitudinal center lines of said first and second air inlet ends of said inner and outer rails are defined to be generally parallel to said longitudinal center line of said slider.

13. A disk drive according to claim 11, wherein longitudinal center lines of said first and second air outlet ends of said inner and outer rails are inclined at a second given angle with respect to said longitudinal center line of said slider so that end portions of said first and second air outlet ends on the side of said air inlet end are nearer to said outer side of said head slider.

14. A disk drive comprising:

a housing;

a disk rotatably mounted in said housing;

a head slider having a transducer for reading/writing data from/to said disk; and an actuator for moving said head slider across tracks of said disk;

said head slider including:

an inner side facing radially inwardly of said disk;

an outer side facing radially outwardly of said disk;

an inner rail formed on a disk opposing surface of said head slider so as to extend substantially from an air inlet end to an air outlet end, said inner rail having a generally flat air bearing surface for generating a flying force during rotation of said disk, said inner rail comprising a first air inlet end portion, a first air outlet end portion, and a first intermediate portion connecting said first air inlet end portion and said first air outlet end portion;

an outer rail formed on said disk opposing surface in spaced relationship from said inner rail so as to extend substantially from said air inlet end to said air outlet end, said outer rail having a generally flat air bearing surface for generating a flying force during rotation of said disk, said outer rail comprising a second air inlet end portion, a second air outlet end portion, and a second intermediate portion connecting said second air inlet end portion and said second air outlet end portion; and a groove defined between said inner rail and said outer rail for expanding air once compressed to generate a negative pressure;

wherein a longitudinal center line of said first intermediate portion of said inner rail and a longitudinal center line of said second intermediate portion of said outer rail are inclined at a given angle with respect to a longitudinal center line of said slider so that end portions of said first and second intermediate portions on the side of said air inlet end are nearer to said inner side of said head slider;

and further wherein longitudinal center lines of portions of said inner and outer rails other than said first and second intermediate portions are not inclined at said given angle, whereby said longitudinal center lines of said first and second intermediate portions of said inner and outer rails are the only longitudinal center lines of said inner and outer rails inclined at said given angle.

15. A disk drive according to claim 14, further comprising a center rail formed in the vicinity of said air inlet end between said inner rail and said outer rail.

16. A disk driver according to claim 14, wherein said first intermediate portion is narrower than said first air inlet end portion and said first air outlet end portion, and said second intermediate portion is narrower than said second air inlet end portion and said second air outlet end portion.

17. A disk drive according to claim 14, wherein longitudinal center lines of said first and second air inlet ends of said inner and outer rails are defined to be generally parallel to said longitudinal center line of said slider.

18. A disk drive according to claim 14, wherein longitudinal center lines of said first and second air outlet ends of said inner and outer rails are inclined at a second given angle with respect to said longitudinal center line of said slider so that end portions of said first and second air outlet ends on the side of said air inlet end are nearer to said outer side of said head slider.

* * * * *

UNITED STATES PATENT AND TRADEMARK OFFICE
CERTIFICATE OF CORRECTION

PATENT NO. : 6,128,162
DATED : October 3, 2000
INVENTOR(S) : Masaki Kameyama

It is certified that error appears in the above-identified patent and that said Letters Patent is hereby corrected as shown below:

Column 12,
Line 31, delete "arc" and insert -- are --

Signed and Sealed this

Thirtieth Day of October, 2001

Attest:

NICHOLAS P. GODICI
Attesting Officer   Acting Director of the United States Patent and Trademark Office